US009820169B2

(12) United States Patent
Chou

(10) Patent No.: US 9,820,169 B2
(45) Date of Patent: Nov. 14, 2017

(54) INTERFERENCE MANAGEMENT METHOD FOR WIRELESS COMMUNICATION SYSTEM, ANCHOR APPARATUS, BASE STATION AND SYSTEM THEREOF

(71) Applicant: Industrial Technology Research Institute, Hsinchu (TW)

(72) Inventor: Kuan-Hung Chou, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 70 days.

(21) Appl. No.: 14/217,497

(22) Filed: Mar. 18, 2014

(65) Prior Publication Data

US 2014/0269565 A1   Sep. 18, 2014

Related U.S. Application Data

(60) Provisional application No. 61/802,747, filed on Mar. 18, 2013, provisional application No. 61/819,671, filed on May 6, 2013.

(30) Foreign Application Priority Data

Jan. 24, 2014   (TW) .............................. 103102708 A

(51) Int. Cl.
*H04W 16/10*   (2009.01)
*H04W 24/02*   (2009.01)
*H04L 5/00*   (2006.01)

(52) U.S. Cl.
CPC ........... *H04W 24/02* (2013.01); *H04L 5/0062* (2013.01); *H04L 5/0094* (2013.01); *H04W 16/10* (2013.01)

(58) Field of Classification Search
CPC ... H04L 1/0027; H04L 5/0035; H04L 5/0062; H04L 5/0073; H04L 5/0094;
(Continued)

(56) References Cited

U.S. PATENT DOCUMENTS 8,095,139 B2 *   1/2012   Marinier ............. H04W 52/343
                                                              455/446
8,139,548 B2   3/2012   Park et al.
(Continued)

FOREIGN PATENT DOCUMENTS

CN   101969370   2/2011
CN   102036295   4/2011
(Continued)

OTHER PUBLICATIONS

3GPP, Technical Specification 36.423: X2 Application Protocol (X2AP), Sep. 2014, 3GPP, Version 12.2.0, pp. 19-21, 67-71, 84-85.*
(Continued)

*Primary Examiner* — Eric Nowlin
(74) *Attorney, Agent, or Firm* — JCIPRNET

(57) ABSTRACT

An interference management method for a wireless communication system, an anchor apparatus, a base station and a wireless communication system thereof are provided. The method includes the following steps. Receiving at least one base station information from the plurality of base stations. Finding at least one interference relationship of the base stations according to the base station information, and grouping the base stations into the at least one cluster according to the interference relationship. Each of the at least one cluster includes at least one base station. Deciding a selected group of uplink-downlink (UL-DL) configurations related to one or more clusters of the at least one cluster, wherein the selected group includes at least one of the UL-DL configurations. And, informing the base stations (Continued)

in at least one cluster to adjust the UL-DL configurations of the base stations according to the selected group of UL-DL configurations.

23 Claims, 7 Drawing Sheets

(58) Field of Classification Search
CPC .... H04L 5/0096; H04L 5/0032; H04W 16/10; H04W 24/02; H04W 28/08; H04W 28/16; H04W 72/04; H04W 72/0406; H04W 72/0446; H04W 72/12; H04W 28/0289; H04W 52/243; H04W 72/082; H04W 84/045; H04J 11/0056
See application file for complete search history.

(56) References Cited

U.S. PATENT DOCUMENTS

| | | | | |
|---|---|---|---|---|
| 8,442,525 B2* | 5/2013 | Luo | H04W 72/082 | 370/348 |
| 8,565,785 B2* | 10/2013 | Lee | H04W 72/082 | 37/335 |
| 8,611,823 B2* | 12/2013 | Weng | H04W 72/02 | 455/63.1 |
| 8,619,687 B2* | 12/2013 | Choudhury | H04W 72/0426 | 370/329 |
| 8,694,015 B2* | 4/2014 | Hsiao | H04W 72/082 | 455/41.1 |
| 8,781,490 B2* | 7/2014 | Zhu | H04L 5/003 | 455/452.1 |
| 8,837,412 B2* | 9/2014 | Liang | H04W 72/0453 | 370/328 |
| 8,909,157 B2* | 12/2014 | Kruglick | H04W 72/0426 | 370/246 |
| 8,924,983 B2* | 12/2014 | Zhu | H04W 72/0486 | 718/103 |
| 8,976,729 B2* | 3/2015 | Luo | H04W 52/146 | 370/328 |
| 9,066,364 B2* | 6/2015 | Skarby | H04W 72/1226 | |
| 9,088,394 B2* | 7/2015 | Seo | H04W 72/082 | |
| 9,100,970 B2* | 8/2015 | Lee | H04W 72/082 | |
| 9,107,068 B2* | 8/2015 | Wang | H04W 16/04 | |
| 9,119,097 B2* | 8/2015 | Chatterjee | H04W 28/02 | |
| 9,154,267 B2* | 10/2015 | He | H04W 28/08 | |
| 9,155,077 B2* | 10/2015 | Song | H04L 1/00 | |
| 9,185,620 B2* | 11/2015 | Khoryaev | H04W 24/10 | |
| 9,226,303 B2* | 12/2015 | Kronestedt | H04W 72/085 | |
| 9,264,204 B2* | 2/2016 | Seo | H04J 11/0056 | |
| 9,338,754 B2* | 5/2016 | Fu | H04L 5/00 | |
| 9,356,725 B2* | 5/2016 | Vajapeyam | H04J 11/0056 | |
| 9,369,969 B2* | 6/2016 | Chang | H04W 52/24 | |
| 9,433,004 B2* | 8/2016 | Siomina | H04W 72/082 | |
| 9,439,210 B2* | 9/2016 | Seo | H04W 72/082 | |
| 9,520,970 B2* | 12/2016 | Kim | H04W 52/243 | |
| 9,525,446 B2* | 12/2016 | Davydov | H04W 72/12 | |
| 9,559,795 B2* | 1/2017 | Bjorken | H04W 16/14 | |
| 9,622,251 B2* | 4/2017 | Li | H04W 72/082 | |
| 9,693,304 B2* | 6/2017 | Davydov | H04W 52/04 | |
| 2009/0086861 A1* | 4/2009 | Yavuz | H04W 52/367 | 375/346 |
| 2009/0137221 A1* | 5/2009 | Nanda | H04W 74/04 | 455/296 |
| 2009/0203372 A1* | 8/2009 | Horn | H04W 72/082 | 455/422.1 |
| 2009/0227263 A1* | 9/2009 | Agrawal | H04W 16/16 | 455/452.1 |
| 2009/0245085 A1 | 10/2009 | Tao et al. | | |
| 2009/0252099 A1* | 10/2009 | Black | H04W 72/085 | 370/329 |
| 2011/0044247 A1* | 2/2011 | Luo | H04W 52/146 | 370/328 |
| 2011/0105135 A1* | 5/2011 | Krishnamurthy | H04W 16/10 | 455/450 |
| 2011/0136494 A1* | 6/2011 | Kim | H04W 72/0426 | 455/450 |
| 2011/0195724 A1* | 8/2011 | Lee | H04W 72/082 | 455/456.1 |
| 2011/0201341 A1* | 8/2011 | Choudhury | H04W 72/0426 | 455/450 |
| 2011/0250882 A1* | 10/2011 | Gao | H04W 24/10 | 455/423 |
| 2011/0269493 A1* | 11/2011 | Zhu | H04L 5/003 | 455/509 |
| 2012/0026909 A1* | 2/2012 | Seok | H04B 7/0417 | 370/252 |
| 2012/0040683 A1* | 2/2012 | Shan | H04W 16/14 | 455/450 |
| 2012/0071101 A1 | 3/2012 | Wentink et al. | | |
| 2012/0087266 A1* | 4/2012 | Vajapeyam | H04J 11/0056 | 370/252 |
| 2012/0149362 A1* | 6/2012 | Tooher | H04W 24/10 | 455/423 |
| 2012/0202540 A1* | 8/2012 | Lee | H04W 72/082 | 455/501 |
| 2012/0213123 A1 | 8/2012 | Futaki | | |
| 2012/0269155 A1* | 10/2012 | Liang | H04W 72/0453 | 370/329 |
| 2012/0282943 A1* | 11/2012 | Hsiao | H04W 72/082 | 455/452.2 |
| 2012/0315840 A1* | 12/2012 | Wang | H04W 16/04 | 455/7 |
| 2012/0322453 A1* | 12/2012 | Weng | H04W 72/02 | 455/450 |
| 2012/0331478 A1* | 12/2012 | Zhu | H04W 72/0486 | 718/104 |
| 2013/0017793 A1* | 1/2013 | Henttonen | H04W 52/52 | 455/63.1 |
| 2013/0040683 A1* | 2/2013 | Siomina | H04W 28/0236 | 455/517 |
| 2013/0051359 A1* | 2/2013 | Skarby | H04W 72/1226 | 370/330 |
| 2013/0155917 A1 | 6/2013 | Hu et al. | | |
| 2013/0194980 A1* | 8/2013 | Yin | H04L 1/1854 | 370/280 |
| 2013/0201966 A1* | 8/2013 | Weng | H04W 72/04 | 370/336 |
| 2013/0272170 A1* | 10/2013 | Chatterjee | H04W 28/02 | 370/280 |
| 2013/0301423 A1* | 11/2013 | Sirotkin | H04W 76/048 | 370/241.1 |
| 2013/0303177 A1* | 11/2013 | Chen | H04W 72/00 | 455/450 |
| 2013/0322235 A1* | 12/2013 | Khoryaev | H04W 24/10 | 370/229 |
| 2013/0329612 A1* | 12/2013 | Seo | H04J 11/0056 | 370/280 |
| 2014/0003262 A1* | 1/2014 | He | H04W 28/08 | 370/252 |
| 2014/0038631 A1* | 2/2014 | Kruglick | H04W 72/0426 | 455/452.2 |
| 2014/0038653 A1* | 2/2014 | Mildh | H04W 28/048 | 455/501 |
| 2014/0087747 A1* | 3/2014 | Kronestedt | H04W 72/082 | 455/452.1 |
| 2014/0092823 A1* | 4/2014 | Song | H04L 1/00 | 370/329 |
| 2014/0198766 A1* | 7/2014 | Siomina | H04W 72/082 | 370/330 |
| 2014/0211734 A1* | 7/2014 | Seo | H04J 11/0056 | 370/329 |
| 2014/0226575 A1* | 8/2014 | Davydov | H04W 52/04 | 370/329 |
| 2014/0254531 A1* | 9/2014 | Lee | H04L 5/006 | 370/329 |
| 2014/0269456 A1* | 9/2014 | Wang | H04B 7/2656 | 370/280 |
| 2014/0269565 A1* | 9/2014 | Chou | H04W 24/02 | 370/329 |

(56) References Cited

U.S. PATENT DOCUMENTS

| | | | |
|---|---|---|---|
| 2014/0293906 A1* | 10/2014 | Chang | H04W 52/24 370/329 |
| 2014/0301251 A1* | 10/2014 | Chen | H04W 72/02 370/278 |
| 2014/0301332 A1* | 10/2014 | Kim | H04J 11/005 370/329 |
| 2014/0334351 A1* | 11/2014 | Yin | H04L 5/0091 370/280 |
| 2014/0341089 A1* | 11/2014 | Ji | H04L 5/0073 370/278 |
| 2015/0003301 A1* | 1/2015 | He | H04B 7/0452 370/280 |
| 2015/0036580 A1* | 2/2015 | Siomina | H04L 1/1854 370/312 |
| 2015/0043544 A1* | 2/2015 | Seo | H04B 7/2656 370/336 |
| 2015/0045076 A1* | 2/2015 | Pan | H04W 16/10 455/501 |
| 2015/0055523 A1* | 2/2015 | Lei | H04W 72/0446 370/280 |
| 2015/0085677 A1* | 3/2015 | Pourahmadi | H04L 5/0041 370/252 |
| 2015/0098380 A1* | 4/2015 | Tseng | H04W 76/048 370/311 |
| 2015/0103706 A1* | 4/2015 | Li | H04W 16/10 370/280 |
| 2015/0163815 A1* | 6/2015 | Lei | H04W 16/10 370/280 |
| 2015/0188690 A1* | 7/2015 | Khoryaev | H04W 52/0251 370/280 |
| 2015/0189652 A1* | 7/2015 | Mizusawa | H04L 5/0032 370/280 |
| 2015/0208363 A1* | 7/2015 | Fu | H04L 5/00 370/280 |
| 2015/0208411 A1* | 7/2015 | Mochizuki | H04W 72/1226 455/452.1 |
| 2015/0215962 A1* | 7/2015 | Mizusawa | H04W 16/16 370/280 |
| 2015/0264594 A1* | 9/2015 | Davydov | H04W 72/12 370/252 |
| 2015/0271687 A1* | 9/2015 | Fechtel | H04W 24/02 370/252 |
| 2015/0305060 A1* | 10/2015 | Seo | H04W 72/082 455/452.1 |
| 2015/0326360 A1* | 11/2015 | Malladi | H04L 5/0032 370/329 |
| 2015/0349942 A1* | 12/2015 | Chatterjee | H04W 28/02 370/280 |
| 2015/0365180 A1* | 12/2015 | Bjorken | H04W 16/14 455/296 |
| 2015/0365960 A1* | 12/2015 | Davydov | H04W 36/14 370/252 |
| 2015/0372772 A1* | 12/2015 | Kim | H04B 15/00 370/329 |
| 2016/0050577 A1* | 2/2016 | Rao | H04W 48/18 370/252 |
| 2016/0066288 A1* | 3/2016 | Feng | H04W 52/54 370/280 |
| 2016/0080948 A1* | 3/2016 | Lee | H04W 52/325 370/329 |
| 2016/0094968 A1* | 3/2016 | Papa | H04W 4/22 455/404.1 |
| 2016/0183269 A1* | 6/2016 | Badic | H04B 15/00 455/454 |
| 2016/0205690 A1* | 7/2016 | Berggren | H04L 5/001 370/280 |
| 2016/0248559 A1* | 8/2016 | Guo | H04J 11/0023 |
| 2016/0249337 A1* | 8/2016 | Liang | H04W 72/042 |
| 2016/0309356 A1* | 10/2016 | Madan | H04W 72/0453 |
| 2016/0359597 A1* | 12/2016 | Seo | H04W 72/082 |
| 2017/0012750 A1* | 1/2017 | Chen | H04L 5/0032 |
| 2017/0026960 A1* | 1/2017 | Mestanov | H04W 72/0426 |

FOREIGN PATENT DOCUMENTS

| | | |
|---|---|---|
| CN | 102104881 | 6/2011 |
| CN | 102821418 | 12/2012 |
| TW | I393474 | 4/2013 |
| WO | 2011159988 | 12/2011 |
| WO | 2012043937 | 4/2012 |
| WO | 2013056494 | 4/2013 |

OTHER PUBLICATIONS

Pan, Tdoc:R1-134019:LS on LTE_TDD_eIMTA, Aug. 23, 2013, 3GPP, pp. 1-2.*

Pan, Tdoc:R1-134986:LS on LTE_TDD_eIMTA, Oct. 11, 2013, 3GPP, pp. 1-2.*

Catt et al., Tdoc:R3-140863:Change Request, Apr. 4, 2014, 3GPP, pp. 1-12.*

3GPP TS 36.423 V10.5.0, Technical Specification Group Radio Access Network; Evolved Universal Terrestrial Radio Access Network (E-UTRAN); X2 application protocol (X2AP) (Release 10), Mar. 9, 2012.

"Office Action of Taiwan Counterpart Application", dated Jun. 26, 2015, p. 1-p. 20.

3rd Generation Partnership Project (3GPP), "Technical Specification Group Radio Access Network; Evolved Universal Terrestrial Radio Access Network (E-UTRAN); X2 application protocol (X2AP) (Release 11)," 3GPP TS 36.423 V11.6.0, Sep. 2013, pp. 1-144.

3rd Generation Partnership Project (3GPP), "Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)," 3GPP TS 36.828 V11.0.0, Jun. 2012, pp. 1-109.

Jan Ellenbeck, et al., "Performance of Decentralized Interference Coordination in the LTE Uplink," IEEE 70rd Vehicular Technology Conference (VTC Spring), Sep. 20-23, 2009, pp. 1-5.

Dengkun Xiao, et al., "LI Delay Impact on ICIC in type 1 Relay," International Conference on Wireless Networks and Information Systems, Dec. 28-29, 2009, pp. 1-4.

Afef Feki, et al., "Self-Organized Resource allocation for LTE Pico Cells: A Reinforcement Learning Approach," IEEE 75rd Vehicular Technology Conference (VTC Spring), May 6-9, 2012, pp. 1-5.

Talha Zahir, et al., "Interference Management in Femtocells," IEEE Communications Surveys & Tutorials, vol. 15, No. 1, First Quarter 2013, pp. 1-19.

Ahmed Triki and Loutfi Nuaymi, "InterCell Interference Coordination Algorithms in OFDMA wireless systems," IEEE 73rd Vehicular Technology Conference (VTC Spring), May 15, 2011, pp. 1-6.

"Office Action of China Counterpart Application," dated Feb. 4, 2017, p. 1-p. 15.

* cited by examiner

INTERFERENCE MANAGEMENT METHOD FOR WIRELESS COMMUNICATION SYSTEM, ANCHOR APPARATUS, BASE STATION AND SYSTEM THEREOF

CROSS-REFERENCE TO RELATED APPLICATION

This application claims the priority benefits of U.S. provisional application Ser. No. 61/802,747, filed on Mar. 18, 2013 and U.S. provisional application Ser. No. 61/819,671, filed on May 6, 2013 and Taiwan application serial no. 103102708, filed on Jan. 24, 2014. The entirety of each of the above-mentioned patent applications is hereby incorporated by reference herein and made a part of this specification.

TECHNICAL FIELD

The disclosure relates to an interference management method for a wireless network.

BACKGROUND

In cellular wireless networks, base stations and user equipments (UE) are communicated with each other by utilizing two transmission direction, downlink (DL) and uplink (UL), respectively, and above-said communication is also known as a uplink-downlink (UL-DL) communication. In addition, a specific application protocol may also be used between base stations 110 to 150, so as to solve problems of mutual interference, management of the UE and so forth.

During reconfiguration of a base station adopting 3rd Generation Partnership Project (3GPP) Long Term Evolution (LTE) Time-Division Duplexing (TDD), a corresponding UL-DL standard configuration may be selected according to current UL-DL transmission conditions, such as UL traffic and DL traffic, to improve transmission traffic. In a LTE TDD standard, a plurality of UL-DL standard configurations are provided.

Referring to FIG. 1 and Table (1), FIG. 1 is a schematic diagram of a wireless communication system. In FIG. 1, with reference to related settings as shown in Table (1), each of cell stations 110 to 150 selects one UL-DL configuration according to the UL-DL transmission conditions on their own. Table (1) discloses seven configurations among the UL-DL standard configurations in 3GPP Long Term Evolution (LTE) TDD. Each of the UL-DL standard configurations uses one frame as a unit, and each frame has 10 subframes.

TABLE 1

| Cell Station | UL-DL Configuration | DL-UL Switch-Point Periodicity | Subframe Number | | | | | | | | | |
|---|---|---|---|---|---|---|---|---|---|---|---|---|
| | | | 0 | 1 | 2 | 3 | 4 | 5 | 6 | 7 | 8 | 9 |
| 110 | 0 | 5 ms | D | S | U | U | U | D | S | U | U | U |
| 140 | 1 | 5 ms | D | S | U | U | D | D | S | U | U | D |
| | 2 | 5 ms | D | S | U | D | D | D | S | U | D | D |
| 120 | 3 | 10 ms | D | S | U | U | U | D | D | D | D | D |
| | 4 | 10 ms | D | S | U | U | D | D | D | D | D | D |
| 150 | 5 | 10 ms | D | S | U | D | D | D | D | D | D | D |
| 130 | 6 | 5 ms | D | S | U | U | U | D | S | U | U | D |

Each of the cell stations 110 to 150 selects the corresponding UL-DL configuration according to the UL-DL transmission condition of their own. For instance, the cell stations 110, 120, 130, 140, 150 select the UL-DL configurations 0, 3, 6, 1 and 5, respectively. A base station communication link may also be provided between the cell stations, such as base station communication links 102, 104, 106 provided between the base stations 110 and 120, between the base stations 120 and 130, and between the base stations 140 and 150, respectively. Table (1) illustrates information for each of the configurations, in which "DL-to-UL Switch-point Periodicity" is 5 ms or 10 ms, and configurations for the subframes 0 to 9 are as shown in Table (1). In Table (1), "D" refers to the subframe for a DL transmission, "S" refers to one special subframe for a guard time; and "U" refers to the subframe for a UL transmission.

When the cell station 120 adopting the UL-DL configuration "3" transmits a DL 101 in the subframes 7 and 8, it may cause a severe interference to a neighboring cell station 110 adopting the UL-DL configuration "0" to receive the subframes 7 and 8 in a UL 103. This is because a transmission power of the cell station 120 for DL 101 is far greater than the cell station 120 of a user equipment UE in transmitting the UL 103. In case the user equipment UE and a neighboring picocell base station are transmitting at the same time but with different configurations, a UL Signal-to-interference noise ratio (SINR) of the user equipment UE is interfered by the DL of the picocell base station more seriously. Therefore, how to mitigate interferences between the base stations is a major issue in the field of LTE TDD wireless network technology.

Moreover, base station information for communication between a plurality of Evolved Node Base stations (eNBs) plays a very important role in the interference management method. Accordingly, the interference management method based on base station information exchange is currently under development.

SUMMARY

The present disclosure is direct to an interference management method for a wireless communication system, an anchor apparatus, a base station and a system thereof, capable of managing interference of base stations.

An interference management method for a wireless communication system is provided according to an embodiment of the present disclosure, in which the wireless communication system has a plurality of base stations. The interference management method includes the following steps. At least one base station information is received from the base stations, in which the base stations communicate with at least one corresponding user equipment by using at least one selected uplink-downlink (UL-DL) configuration. At least one interference relationship of the base stations is found according to the base station information, and grouping the base stations into the at least one cluster according to the at least one interference relationship. Each of the clusters includes at least one base station. A selected group of UL-DL configurations related to one or more clusters of the at least one cluster is decided, in which the selected group of UL-DL configurations includes the at least one UL-DL configuration. At least one base station in the at least one cluster is informed to adjust the UL-DL configuration of the at least one base station according to the selected group of UL-DL configurations.

A wireless communication system is provided according to an embodiment of the present disclosure, which includes an anchor apparatus and a plurality of base stations. The base stations communicate with the anchor apparatus. The anchor apparatus receives at least one base station information from the base stations. The base stations communicate with at least one corresponding user equipment by using at least one uplink-downlink (UL-DL) configuration. The anchor apparatus finds at least one interference relationship between the base stations according to the base station information, groups the base stations into at least one cluster having at least one base station according to the at least one interference relationship, and decides a selected group of UL-DL configurations related to one or more clusters of the at least one cluster, and the selected group of UL-DL configurations includes the at least one UL-DL configuration. The anchor apparatus informs at least one base station in the at least one cluster to adjust the UL-DL configuration of the at least one base station according to the selected group of UL-DL configurations.

An anchor apparatus is provided according to an embodiment of the present disclosure, suitable for a wireless communication system having a plurality of base stations. The anchor apparatus includes a transceiver and a processor. The transceiver receives at least one base station information from the base stations. The base stations communicate with at least one corresponding user equipment by using at least one uplink-downlink (UL-DL) configuration. The processor is coupled to the transceiver. The processor finds at least one interference relationship between the base stations according to the base station information, groups the base stations into at least one cluster having at least one base station according to the at least one interference relationship, and decides a selected group of UL-DL configurations related to one or more clusters of the at least one cluster, and each of the selected group of UL-DL configurations includes the at least one UL-DL configuration. The processor informs at least one base station in the at least one cluster through the transceiver to adjust the UL-DL configuration of the at least one base stations according to the selected group of UL-DL configurations.

A wireless communication system is provided according to an embodiment of the present disclosure, which include a first base station and a second base station. The first base station directly or indirectly transmits a base station information to the second base station. Said base station information includes a plurality of overload indications. The overload indications are respectively corresponding to a plurality of subframes or a plurality of subframe groups, and each of the subframe groups includes at least one subframe. The overload indications are configured to indicate a plurality of interference levels corresponding to a plurality of physical resource blocks of the plurality of subframes or the plurality of subframe groups of the first base station.

A wireless communication system is provided according to an embodiment of the present disclosure, which include a first base station and a second base station. The first base station directly or indirectly transmits a base station information to the second base station. The base station information includes at least one high interference information, and each of the high interference information is respectively corresponding to a target base station and physical resource blocks. When the high interference information is a specific content, the high interference information indicates that the first base station transmitting the high interference information is interfered by the second base station.

A base station is provided according to an embodiment of the present disclosure, suitable for a wireless communication system having the base system and another, and the base station includes: a transceiver directly or indirectly transmitting at least one corresponding base station information to the another base station; and a processor coupled to the transceiver, and the processor transmitting a base station information to the another base station through the transceiver, wherein the base station information includes a plurality of overload indications, and the overload indications are respectively corresponding to a plurality of subframes or a plurality of subframe groups, wherein the subframe group includes at least one subframe, and the overload indications are configured to indicate a plurality of interference levels corresponding to a plurality of physical resource blocks of the plurality of subframes or the plurality of subframe groups of the another base station.

A base station is provided according to an embodiment of the present disclosure, suitable for a wireless communication system having the base system and another, and the base station includes: a transceiver directly or indirectly transmitting at least one corresponding base station information to the another base station; and a processor coupled to the transceiver, and the processor transmitting a base station information to the another base station through the transceiver, wherein the base station information includes at least one high interference information, each of the high interference information respectively corresponding to a target base station and physical resource blocks, and when the high interference information is a specific content, the high interference information indicates that the base station transmitting the high interference information is interfered by another base station.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
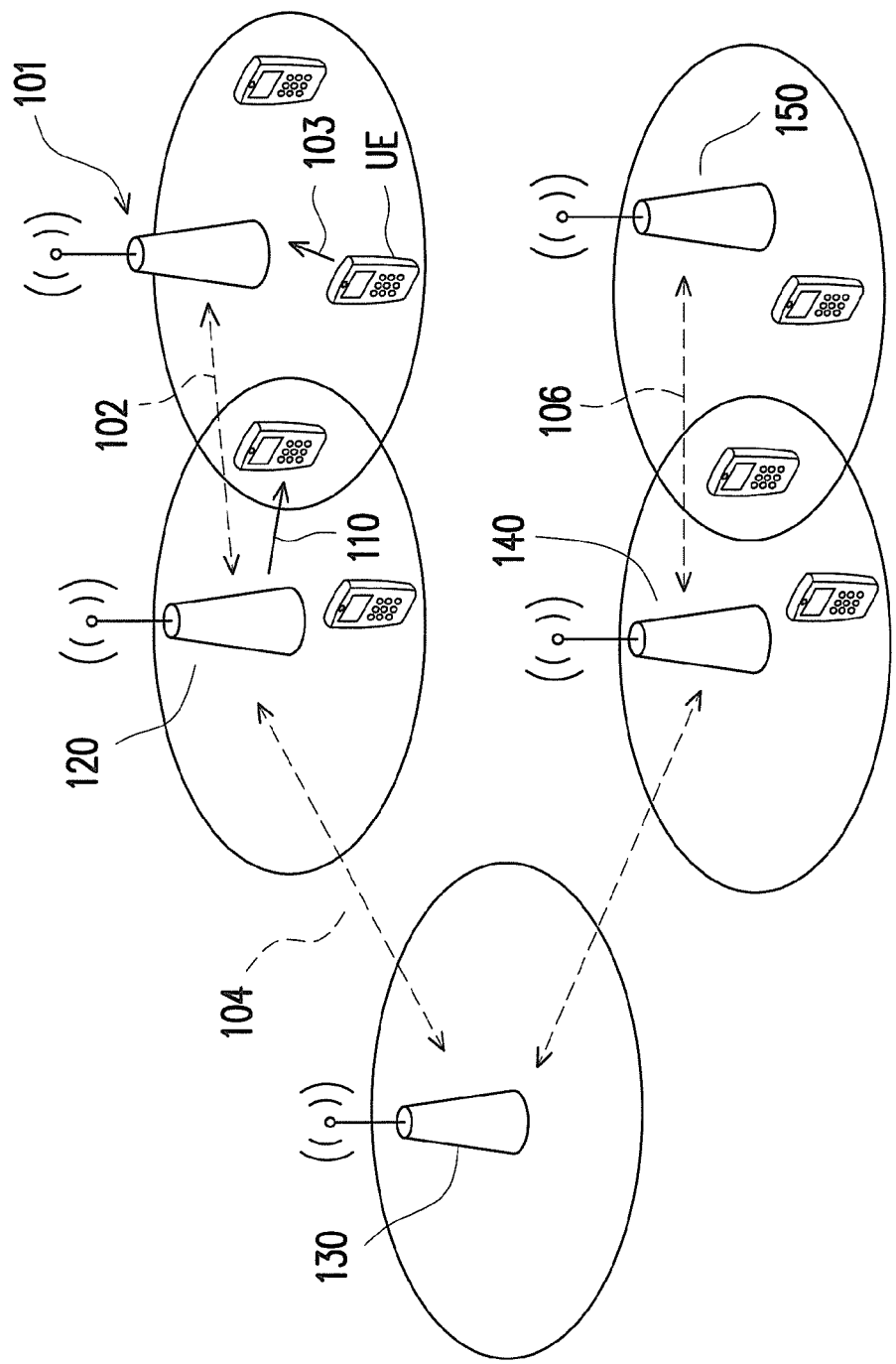
FIG. 1 is a schematic diagram of a wireless communication system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides exemplary embodiments of techniques used in an interference management for a cellular wireless network. The techniques described in the present disclosure may be used in various wireless communication networks including Worldwide Interoperability for Microwave Access (WiMAX) Time-Division Duplexing (TDD), Long Term Evolution (LTE) Time-Division Duplexing (TDD), and other networks. For clarity of description, the techniques in the present disclosure are described by reference with LTE. The wireless communication network includes common cell stations and small cell stations. The term "cell" as described in the present disclosure refers to the base station. The small cell stations are the base stations of, for example, femtocells, picocells, microcells or eNB.

The base stations in the cellular wireless network may cover two types of networks including a homo network or a hetro network for example. Therein, operable networks in the present disclosure may, but not limited to, include only the small cell stations (e.g., the picocells or the femtocells), or include both the microcells and the macrocells, or include only the macrocells. The interference management method according to the exemplary embodiments may be applied in any nodes, and the neighboring nodes may also be any type of nodes.

The interference management may be applied in cellular network nodes of any type. In one embodiment among the exemplary embodiments as provided below, a picocell base station of the small cell among the cellular wireless network is introduced, but the disclosure is not limited thereto. In this embodiment, the interference management method may be implemented by the picocell base station, or implemented by other small cell base station, or implemented in an environment where the small cell base station and the common cell base station are coexisted.

In the interference management method for the cellular wireless network proposed in the exemplary embodiments of the present disclosure, negotiations between different picocell base stations are provided in order to perform the interference management. Through said negotiations, a UL-DL configuration is selected in consideration of interference between the picocell base stations, so that the interference from the neighboring picocell base stations are under management.

A node or a base station of the cellular network may include a transceiver and a processor. The transceiver is configured to transmit and receive wireless signals in the wireless network. The base station adopts at least one of a plurality of uplink-downlink (UL-DL) configurations during transmission. The processor is coupled to the transceiver, and may be configured to negotiate with one or more of the at least one neighboring base station, so as to decide the UL-DL configurations for the picocell base station and the one or more of the at least one neighboring base station during the transmission. Otherwise, the at least one neighboring base station may flexibly select the UL-DL configuration for the transmission. That is, the at least one neighboring base station may freely decide the UL-DL configuration for the transmission based on its requirements.

In LTE, a base station information exchange between Evolved Node Base stations (eNBs) may be implemented by using a X2 application protocol (X2AP). The X2 application protocol (X2AP) provides corresponding procedures for the base station information exchange between a plurality of eNBs. The base station information may include the following information: an eNB configuration, a load information, a cell activation situation and a resource status report and so forth. For instance, the load information may include cell identification, "UL High Interference Information (HII)", "Relative Narrowband Tx Power (RNTP)", "Almost Blank Subframe Information (ABS)", and "UL interference Overload Indication (OI)", as shown in the load information listed in Table (2).

TABLE (2)

| Information Name/Group Name | Presence | Range | Semantics description | IE type and reference |
| --- | --- | --- | --- | --- |
| Information Type | M | | | 9.2.13 |
| Cell Information | M | | | |
| >Cell Information Item | | 1 to <maxCellineNB> | | |
| >>Cell Identification (ID) | M | | identification (ID) of the source cell | ECGI 9.2.14 |
| >>UL Interference Overload Indication (OI) | O | | | 9.2.17 |
| UL High Interference Information (HII) | | 0 to <maxCellineNB> | | 9.2. |
| >>Target Cell Identification (ID) | M | | ID of the cell for which the HII is meant | 9.2.14 |
| >>>UL High Interference Indication | M | | | 9.2.18 |
| >>Relative Narrowband Tx Power (RNTP) | O | | | 9.2.19 |
| >>Almost Blank Subframe Information (ABS) Information | O | | | 9.2.54 |
| >>Invoke Indication | O | | | 9.2.55 |

In Table (2), "M" indicates that "Presence" of this group name is necessary in the load information, and such group name includes "Information Type", "Cell ID" in "Cell Information", "Target Cell ID" and "UL High Interference Indication" in "UL High Interference Information", for example. "O" indicates that "Presence" of this group name is optional in the load information, and such group name includes "UL Interference Overload Indication (OI)" in "Cell Information", "Relative Narrowband Tx Power (RNTP)", "ABS Information", "Invoke Indication", for example. "<maxCellineNB>" indicates a maximum number of the cell stations, and a value thereof may be 256. "IE type and reference" indicates which principle of 3GPP related technical notes can the person applying the present embodiment be referred to.

In the load information receive by a base station, "HII" indicates occurrence of high interference sensitivity that the high UL interference may occur on some of physical resource blocks (PRBs) for the receiving base station. The physical resource block is a unit used to indicate a specific wireless resource. "RNTP" indicates whether DL transmission power per physical resource block (PRB) from a sending base station is lower than a preset RNTP threshold. "ABS Information" indicates the subframes designated as almost blank subframes by the sending base station. "OI" indicates UL interference levels of the PRBs of the UL subframes of the sending base station. In order to achieve the purpose of interference negotiation, the load information may be used by each of the base stations to manage interference through arrangements of transmission links and resource blocks. However, in the current protocol, "OI" uses one set of UL interference levels for representing all UL subframes. In the set of UL interference levels, a first value of the set indicates an average interference level of the first PRBs of all UL subframes, and a second value indicates an average interference level of the second PRBs of all UL subframes, and the rest may be deduced by analogy. DL-UL interference may only occur in some conflicting subframes between the eNBs instead of all UL subframes being highly interfered. Accordingly, "OI" in the current protocol cannot be used by each of the base stations to arrange the interference management for the PRB in each UL subframe.

On the other hand, a component carrier for information transmission known as a carrier aggregation (CA) has been normalized in LTE wireless network. The component carriers with a bandwidth of 1.4, 3, 5, 10, 15 or 20 MHz may be aggregated in PHY layer for increasing a data transmission amount of each UE. In CA, the load information may need to carry more detail information for each of the component carriers.

Accordingly, the present disclosure proposes an interference management method, an anchor apparatus, a base station and a wireless communication system thereof as follows. Said interference management method may be designed to flexibly mitigate the DL-UL interference and include Flexible Clustering-based Interference Management method with Centralized control (CFCIM) and Flexible Clustering-based Interference Management method with Distributed control (DFCIM). CFCIM and DFCIM include one or more cell clusters. Active transmissions of all cells in each of the cell clusters may adopt the same uplink or downlink in one or more subframes, or the cell clusters prone to mutual interference may select the UL-DL configuration with an interference relationship having lower mutual interference from a group of UL-DL configurations set in the interference management method of the present embodiment, so that eNB-to-eNB interference and UE-to-UE interference may be mitigated in the same cell cluster.

Figure 2:
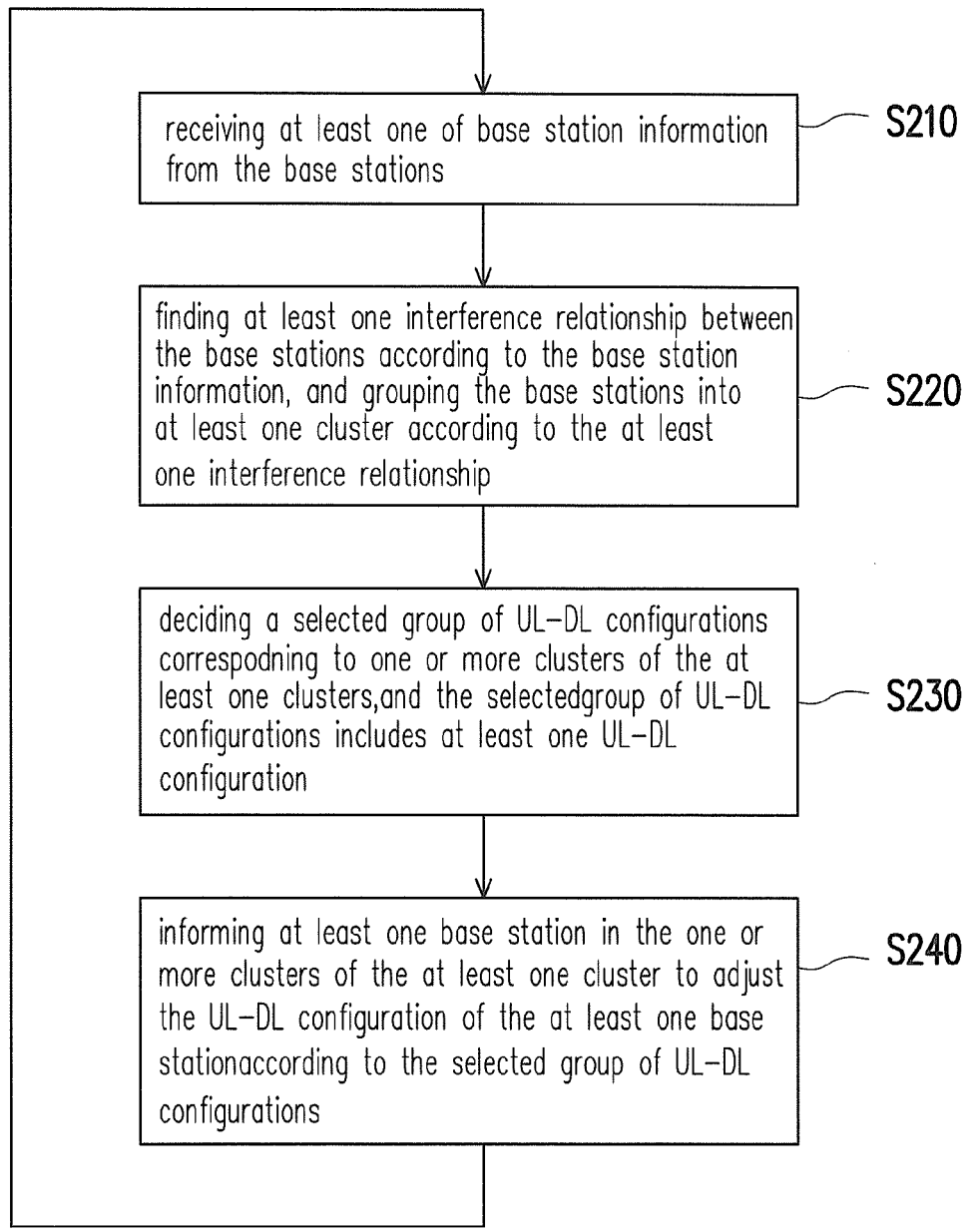
FIG. 2 is a flowchart of an interference management method for a wireless communication system according to the present disclosure.
Figure 3A:
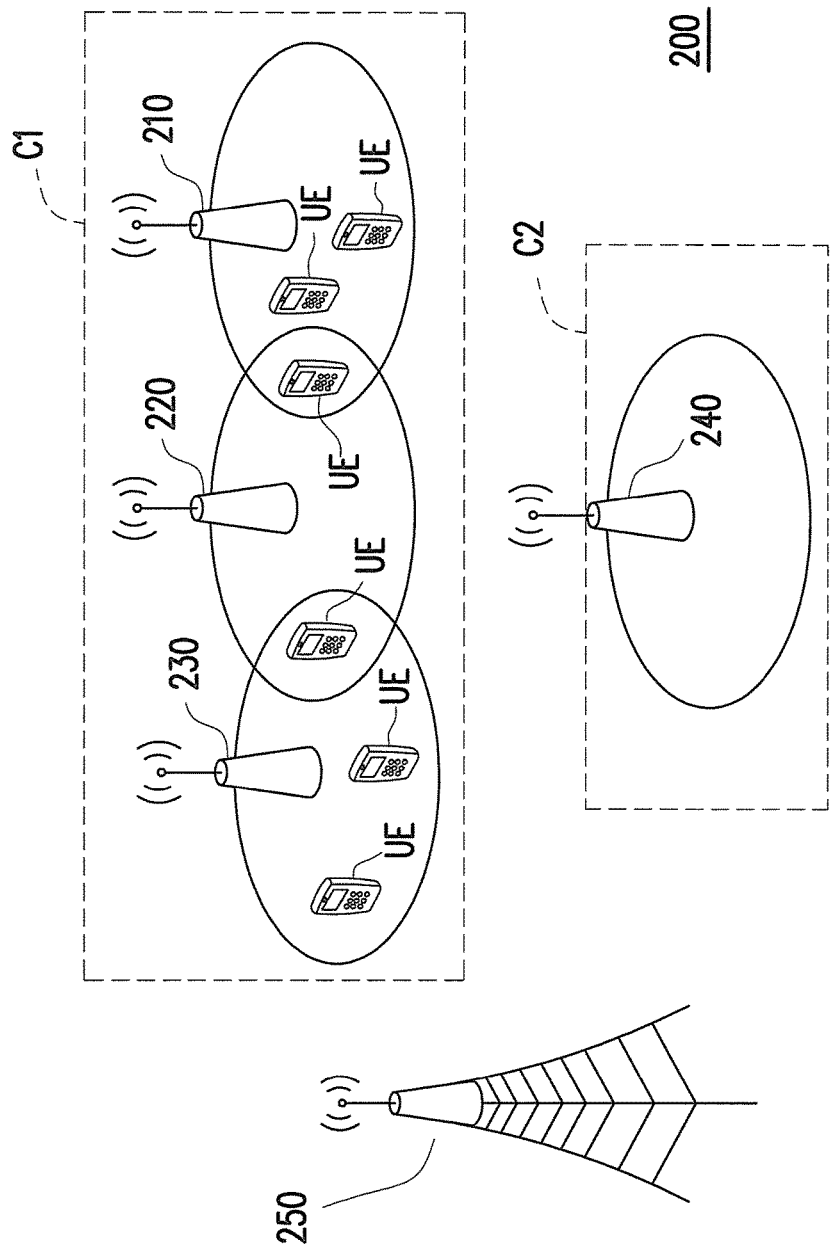
FIGS. 3A and 3B are schematic diagrams of an interference management method for a wireless communication system according to an embodiment of the present disclosure.
Figure 3B:
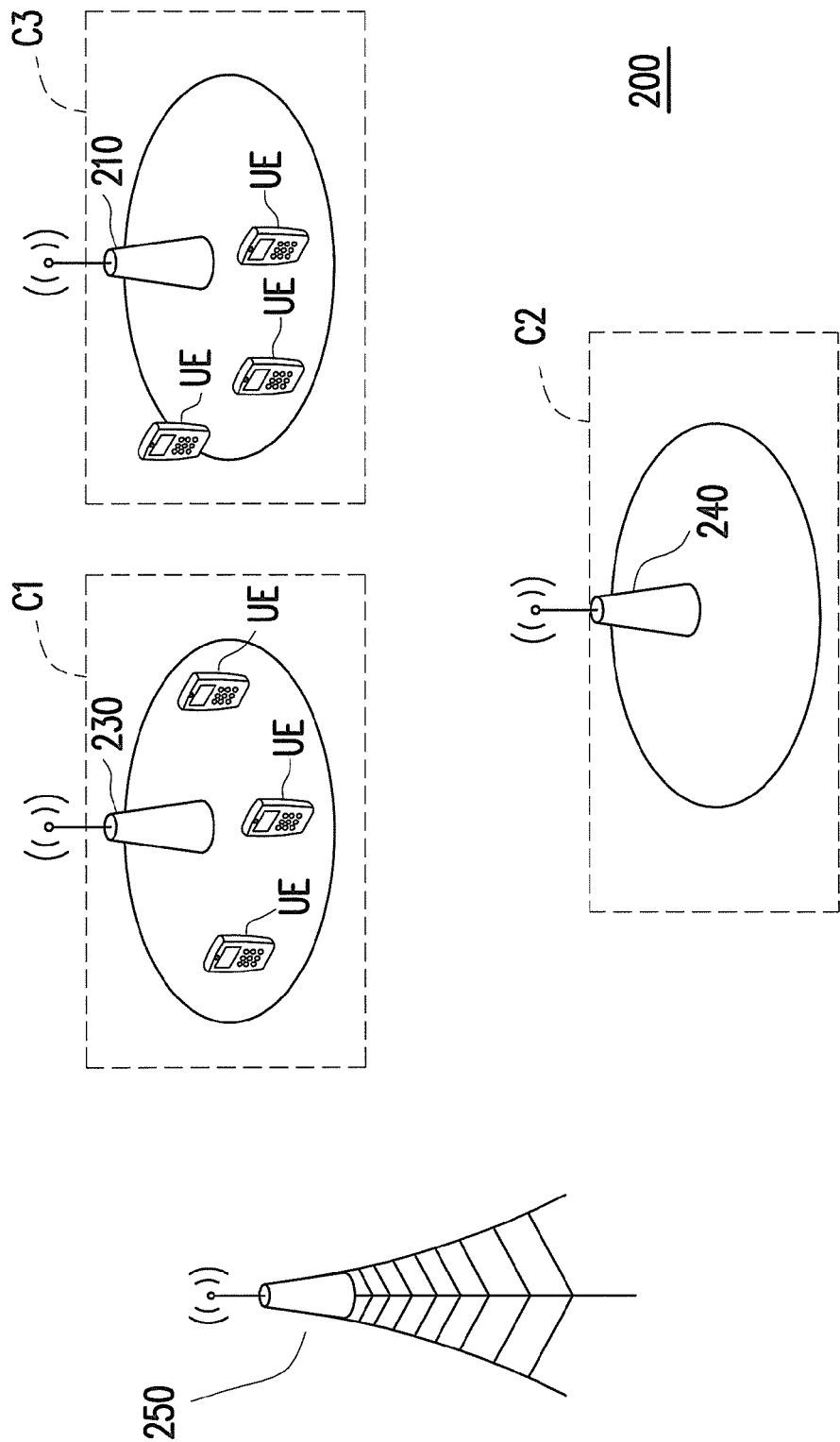
Figure 4:
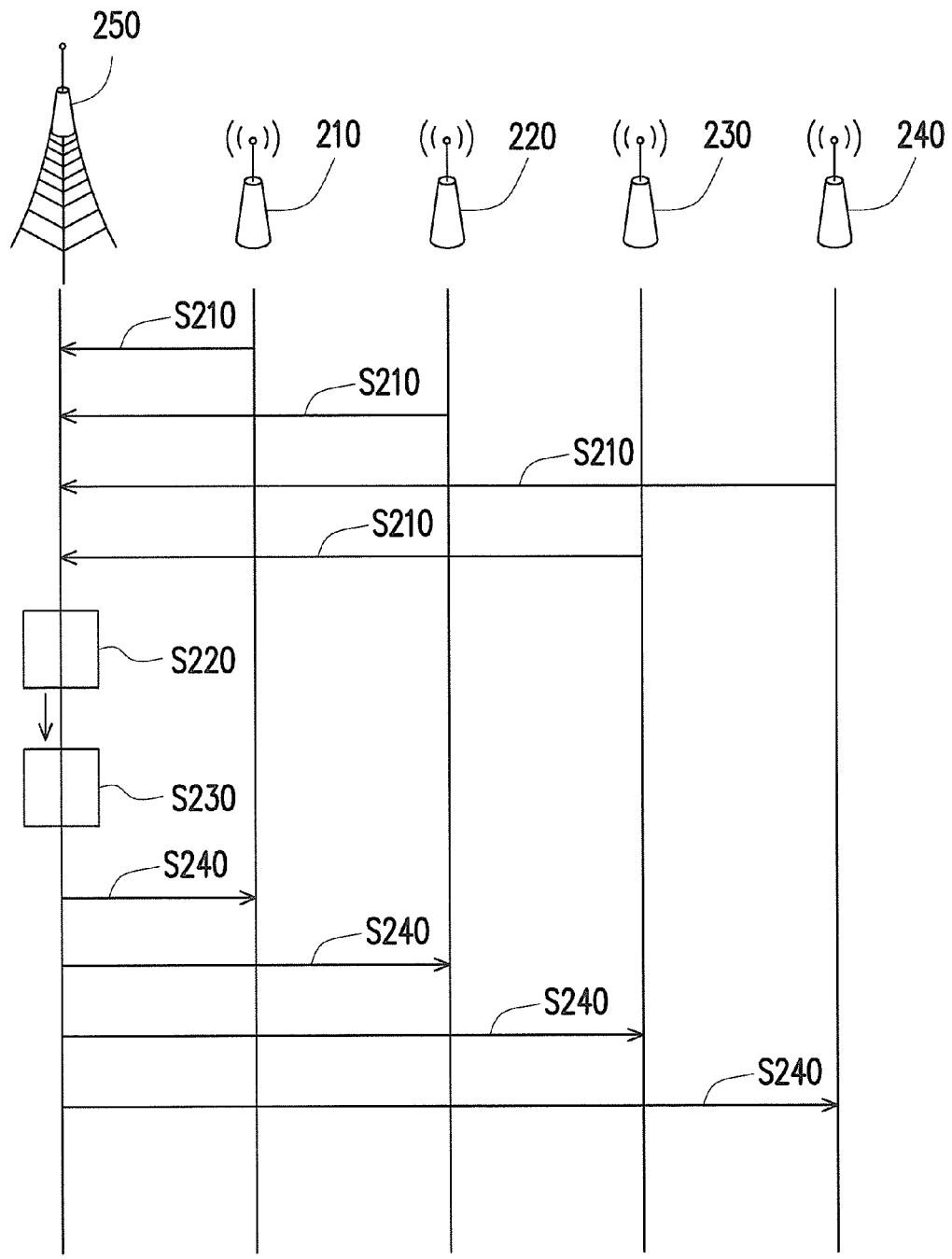
FIG. 4 is a schematic diagram of signal transmission between each of the base stations according to an embodiment of the present disclosure.

FIG. 2 is a flowchart of an interference management method for a wireless communication system according to the present disclosure. FIGS. 3A and 3B are schematic diagrams of an interference management method for a wireless communication system according to an embodiment of the present disclosure. FIG. 4 is a schematic diagram of signal transmission between each of the base stations according to an embodiment of the present disclosure. In FIGS. 3A, 3B and FIG. 4, a wireless communication system 200 includes a plurality of base stations such as picocell base stations 210 to 240 and a microcell base station 250. Each of the base stations shall include transceivers with wireless communication capability and processors. In an embodiment, the wireless communication system 200 uses the microcell base station 250 as an anchor apparatus. In other embodiments of the present disclosure, one of the base stations may be selected from the wireless communication system 200 to be used as the anchor apparatus, or one single station or eNB may be specially set to be used as the anchor apparatus, so as to realize the interference management method of the present disclosure. Each of the base stations uses aforesaid UL-DL configurations to communicate with at least one corresponding user equipment UE located within communication range of the base station.

Referring to FIGS. 2, 3 and FIG. 4, in step S210, the microcell base station 250 may periodically or aperiodically receive at least one base station information from the base stations 210 to 240 in the wireless communication system 200. In addition to the load information, the base station information may further include one or more information of a base station configuration, a base station activation situation and a resource status report. The load information includes at least one overload indication respectively corresponding to one or more subframes in the UL-DL configuration. The overload indications may be used for the microcell base station 250 to determine the UL-DL configurations of the base stations in each of the clusters. The load information may further include one or at least one UL high interference information (HII), and each of the UL high interference information corresponds to one target base station and physical resource blocks in at least one of the subframes. Also, when the UL high interference information is a specific content (e.g., values in the UL high interference information being all "0", being all "1", numbers of "1" while others being "0", numbers of "1" or "0" while others being "0" or "1", or, being "1" and "0", or "0" and "1" which are cross-arranged in sequence.), it indicates that the base station transmitting the UL high interference information is interfered by the target base station. The load information may also include another indication information for indicating that the high interference information is currently representing that a first base station is interfered by a second base station, and the high interference information may be utilized to indicate that one or many physical resource blocks in at least one of the subframes of the first base station which are possibly interfered by the second base station. In the present embodiment, said high interference information may correspond to different subframes respectively, or one high interference information may correspond to two or more subframes. In other words, the subframes may be grouped into a plurality of subframe groups, and each of the subframe groups may include one or at least one subframe.

In step S220, the microcell base station 250 finds at least one interference relationship between the base stations 210 to 240 according to the base station information, and groups the base stations 210 to 240 into at least one cluster according to the at least one interference relationship. Each of the clusters includes at least one base station, and the base stations in the same cluster may be interfered with one another. The base stations in the same cluster have at least one interference relationship.

Herein, take FIG. 3A an example, based on the load information, the UL-DL configuration, the base station activation situation and the resource status report in the base station information, the microcell base station 250 may be informed of the interference relationship including: mutual interference is present between the base stations 210 and 220, mutual interference is present between the base stations 220 and 230, and the base station 240 does not have mutual interference with either one of the base stations 210 and 230. Accordingly, the microcell base station 250 may group the base stations 210 and 230 with mutual interference into one cluster C1, and group the base station 240 into another cluster (e.g., a second cluster C2).

In step S230, the microcell base station 250 may also decide a corresponding group of UL-DL configurations for base stations in one or more clusters of the at least one cluster according to said base station information. Each group of UL-DL configurations may include one or more UL-DL configurations as shown in Table (1). In an embodiment of the present disclosure, the microcell base station 250 may decide a selected group of UL-DL configurations for each cluster through negotiations between the base stations 210 to 240. The negotiation may include at least one base station information transmission, and the microcell base station 250 may reform the cluster of the base stations based on the base station information owned by each of the base stations. It should be noted that, a part of the base stations (in sleep state or with communication stopped) may not participate with said clusters or the UL-DL configurations.

In case the selected group of UL-DL configurations includes at least one UL-DL configuration, the selected UL-DL configuration may be the UL-DL configuration having an arrangement similar to that of UL-DL subframe number, the UL-DL configuration having UL switch point with identical periodicity, or the UL-DL configuration theoretically having lower interference. For instance, a possible signal interference may occur only in subframe 9 of both the UL-DL configuration 0 and the UL-DL configuration 6 as shown in Table (1), so that subframes 0 to 8 of both the UL-DL configuration 0 and the UL-DL configuration 6 may be of the same UL-DL configuration. Therefore, the selected group of UL-DL configurations may include both the UL-DL configuration 0 and the UL-DL configuration 6 at the same time.

In step S240, the microcell base station 250 informs at least one of the base stations 210 to 240 in the at least one cluster to adjust the UL-DL configurations of the at least one of the base stations 210 to 240 according to the selected group of UL-DL configurations. For instance, the base stations 210 to 230 in the cluster C1 are all informed by the microcell base station 250 to select one UL-DL configuration from the selected group of UL-DL configurations (which includes the UL-DL configuration 0 and the UL-DL configuration 6), so as to set the UL-DL configuration for each of the base stations 210 to 230. In the present embodiment, the base stations 210 to 230 may select one of the UL-DL configuration 0 and the UL-DL configuration 6 for setting and adjusting the UL-DL configuration thereof, respectively. The base stations 210 to 230 may select a preferable UL-DL configuration form the selected group of UL-DL configurations according to their transmission requirements, respectively. The base station 240 in the cluster C2 may simply adjust the corresponding UL-DL configuration based on requirements of the UL and the DL without using the UL-DL configuration identical to another base station. In other words, the anchor apparatus (e.g., the microcell base station 250) may set the base stations in the same cluster as the UL-DL configuration of the same or having lower interference. After step S240 is completed, the microcell base station 250 may also periodically or aperiodically return to step S210, so as to continuously determine interference relationships between the base stations 210 to 240 and group said base stations. Accordingly, the wireless communication system 200 may effectively and actively mitigate interference between the base stations 210 to 240 in principle.

It should be noted that, in step S240, when an original UL-DL configuration of one base station is already belong to the selected group of UL-DL configurations decided by the anchor apparatus, it could be not required for the anchor apparatus to inform such base station of the UL-DL configuration.

The present disclosure also provides the embodiment of FIG. 3B as an example served to further describe FIG. 2 and FIG. 4. When the base station 220 stops operating due to some specific reasons, the microcell base station 250 may be informed of the same in the base station information which is received in step S210. In case the base stations 210 and 230 originally assigned to the same cluster C1 does not include at least one interference relationship (i.e., when mutual interference is not present), the microcell base station 250 may assign the base stations 210 and 230 to different clusters. For instance, in FIG. 3B, the microcell base station 250 assigns the base station 210 to the cluster C1, and assigns the base station 230 to a cluster C3. Accordingly, since the base stations 210 and 230 are not interfered with the base station 240, the UL-DL configurations of their own may be adjust freely according to each of the base stations.

An embodiment of the interference management method of the present disclosure may also be applied in a distributive wireless communication system. For instance, it is assumed that the anchor apparatus in FIGS. 3A and 3B is changed to one base station among the base stations 210 to 240 (e.g., the base station 210) instead of the microcell base station 250. The transceiver of the base station 210 may periodically or aperiodically receive the base station information from the base stations 210 to 240 (step S210 of FIG. 2) The processor of the base station 210 finds the interference relationship between the base stations 210 to 240 according to the base station information, and groups the base stations 210 to 240 into at least one cluster according to the interference relationship (step S220 of FIG. 2). The processor of the base station 210 may decide UL-DL configurations for all the base stations in each of the clusters according to the base station information (step S230 of FIG. 2). In an embodiment of the present disclosure, the processor of the base station 210 may decide a selected group of UL-DL configurations for each cluster through negotiations between the base stations 210 to 240. The negotiation may include at least one base station information transmission, and the base station 210 may reform the cluster of the base stations based on the base station information owned by each of the base stations. The microcell base station 250 informs at least one base station in the at least one cluster, so that the UL-DL configuration of at least one of the base stations 210 to 240 may be adjusted to the selected group of UL-DL configurations (step S240 of FIG. 2).

Figure 5:
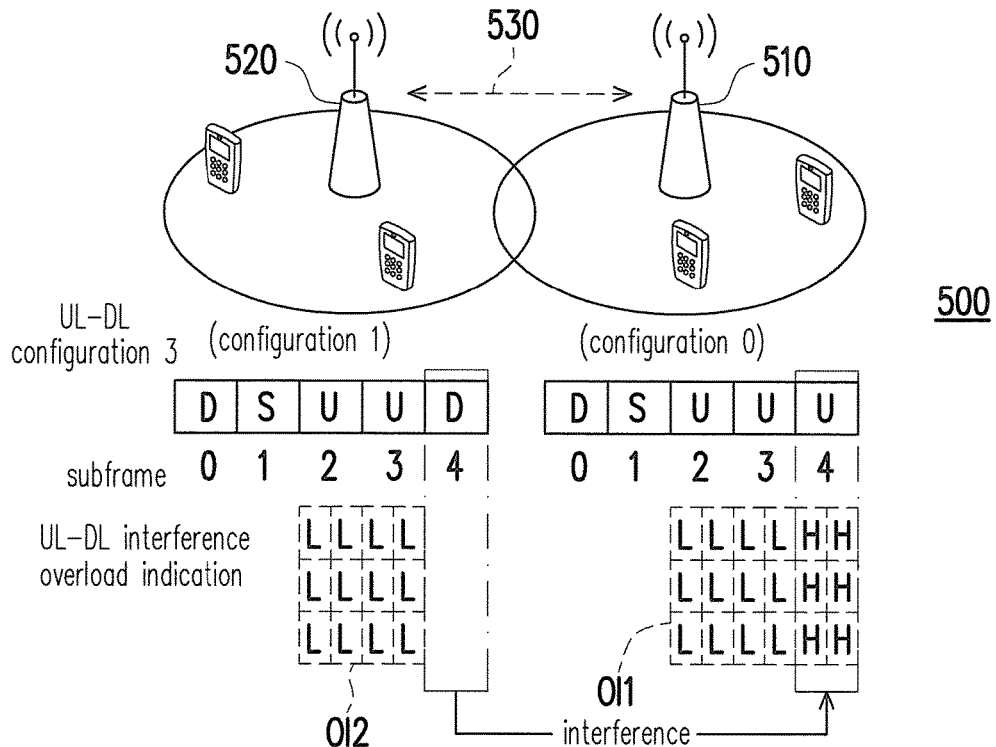
FIGS. 5 to 7 are schematic diagrams of a wireless communication system 500 according to an embodiment of the present disclosure.

Aforesaid interference management method utilizes interference relationships between each of the base stations for setting the base stations with mutual interference to the same group of UL-DL configurations, so as to achieve the interference management. As another aspect of the present disclosure, information (e.g., the base station information, the load information and so forth) are transmitted between the base stations by utilizing the X2AP protocol, S1 protocol of 3GPP LTE or other backhaul signalling protocols, so that the base station may manage interference according to said information. Referring to FIG. 5, FIG. 5 is a schematic diagram of a wireless communication system 500 according to an embodiment of the present disclosure. A wireless communication system 500 includes at least two base stations 510 and 520. Herein, it is assumed that a UL-DL configuration of the base station 510 is configuration 0 and a UL-DL configuration of the base station 520 is configuration 1, and the two neighboring base stations 510 and 520 are prone to mutual interference. The base stations 510 and 520 may transmit the load information directly or indirectly to each other through the X2AP protocol, S1 protocol of 3GPP LTE or other backhaul signalling protocols.

A first base station (e.g., the base station 150) may inform a second base station (e.g., the base station 520) about the load information including a plurality of overload indications OI1. The pluralities of overload indications OI1 and OI2 are configured to indicate interference level corresponding to the physical resource blocks in each subframe of the base stations 510 and 520. In other words, the base station 520 may determine whether the UL-DL configuration thereof requires adjustment according the load information transmitted by the base station 510. The load information and the overload indications are described in details in related embodiments as follows. Accordingly, the base station 520 may confirm the interference in the UL-DL configuration thereof according to the overload indications, so as to adjust that UL-DL configuration to avoid UL-to-UL interference or other interferences. In other words, in the interference management method described in the present disclosure, the overload indications in the subframes may be used to determine the UL-DL configuration in each of the clusters. Herein, the overload indications may correspond to different subframes respectively, or one overload indication may correspond to one or more subframes. In other words, the subframes may be grouped into a plurality of subframe groups, and each of the subframe groups may include one or more than one subframe. The overload indications may correspond to the subframes or the subframe groups. The overload indications may be represented by different names, but each of the overload indications may include similar structure or one set of interference levels.

Herein, the base station information, the load information and the overload indications are described in details below. The present disclosure proposes a new type of load information based on base station information exchange. The base station information exchange may be implemented by using the X2AP protocol, S1 protocol of 3GPP LTE or other backhaul signalling protocols. Said load information includes a plurality of UL overload indications for representing interference levels of all the UL subframes, as shown in the load information listed in Table (3). It should be noted that, the overload indications described in the present disclosure is not limited to only include UL interference overload indications or DL interference overload indications, but also include other data structures with similar structure additionally. The high interference information is not limited to only include a UL high interference information or a DL high interference information, but also include other data structures with similar structure additionally, and the present embodiment is not limited thereto.

TABLE (3)

| Information Name/Group Name | Presence | Range | Semantics description | IE type and reference |
|---|---|---|---|---|
| ... | ... | ... | ... | ... |
| >Cell Information Item | | 1 to <maxCellineNB> | | |
| >>Cell Identification (ID) | M | 1 to <maxCellineNB> | identification (ID) of the source cell | ECGI 9.2.14 |
| >>UL Interference Overload Indication (OI) | O | <u>1 to</u> <u><maxULSubframeinFrame></u> | | ECGI 9.2.17 |
| UL High Interference Information (HII) | | 0 to <maxCellineNB> | | 9.2.18 |
| ... | ... | ... | ... | ... |

Unlike Table (2), in Table (3), the "Range" corresponding to the field ">>UL Interference Overload Indication (OI)" is adjusted from one single set of values of interference levels to multiple sets of values for corresponding to each of the UL subframes (said modification is marked with underline). "<maxULSubframeinFrame>" is a maximum value of the UL subframes possibly being used in one frame, and "<maxULSubframeinFrame>" may be 6 is the present disclosure. In other words, the load information may include a plurality of overload indications. Accordingly, the base station receiving the load information may be informed of the interference levels in each or numbers of the subframes or subframe groups composed of at least one subframes through the UL interference overload indication, so as to facilitate the base station in scheduling served UEs to place important information at the PRB with lower interference and avoiding transmission on PRB with higher interference. It should be noted that in the present disclosure, "<maxULSubframeinFrame>" may also be another name or value. For instance, a value "10" may be used to represent for all subframes in the frame.

The UL interference overload indications are described by reference with FIG. 5. FIG. 5 discloses the UL-DL configurations and the corresponding UL interference overload indications for the base stations 510 and 520. In the present disclosure, for convenience of illustration, the UL-DL configuration only discloses contents regarding the subframe 0 to the subframe 4. The UL interference overload indication is a data indicating whether each PRB in the UL subframe is interfered in the base stations 510 and 520, in which "L" indicates low interference; "M" indicates a medium interference; "H" indicates a high interference. In view of FIG. 5, a UL subframe 4 of the base station 510 is interfered by a DL subframe 4 of the base station 520, such that a plurality of UL interference overload indications OI1 of the base station 510 are marked as "H" and transmitted to the base station 520 through a base station communication link 530. A plurality of UL overload indications OI2 of the base station 520 are transmitted to the base station 510 through the base station communication link 530 generated by the X2AP protocol. A possible interference relationship between the base stations may be found through such determination and used for clustering the base stations.

Another embodiment of the present disclosure is as shown in the load information listed in Table (4) below.

TABLE (4)

| Information Name/Group Name | Presence | Range | Semantics description | IE type and reference |
|---|---|---|---|---|
| Information Type | M | | | 9.2.13 |
| Cell Information | M | | | |
| >Cell Information Item | | 1 to <maxCellineNB> | | |
| ... | ... | ... | ... | ... |
| >>Invoke Indication | O | | | 9.2.55 |
| >>Interference Overload Indication | O | <u>1 to <maxSubframeinFrame></u> | | |

Unlike Table (2), in Table (4), a filed "Interference Overload Indication" is added as an item under the field ">Cell Information Item", and the corresponding "Range" includes multiple sets of values corresponding to each of the subframes in each frame (said modification is marked with underline). It should be noted that, herein, the interference overload indication is used to represent the interference levels of both the UL subframes and the DL subframes, whereas the UL interference overload indication in Table (3) are merely used to represent the interference levels of the UL subframes. The person applying the present embodiment may also let the base station to choose receiving the interference overload indications corresponding to the subframes prone to possible interference, instead of receiving all the interference overload indications corresponding to the subframes. For instance, the base station may selectively receive the interference overload indication of each of DL subframes, or the interference overload indications of the specific subframes (e.g., the subframes 4 or 9). "<maxSubframeinFrame>" is a maximum value of the subframes in one frame. In the present disclosure, "<maxSubframeinFrame>" may be 10, or may be 5, 6, 8 in case one specific subframe group is to be specially indicated.

The situation of FIG. 5 occurs as in an ideal situation where a time offset is not present between the base stations 510 and 520. However, the base stations 510 and 520 may practically include a minor time offset. Accordingly, in addition to the interference overload indication or the UL interference overload indication, the load information shall further include a timestamp or other time reference values between the two base stations. Another embodiment of the present disclosure is as shown in the load information listed in Table (5) below.

Overload Indication (OI)" as in Table (2), a filed ">>Time offset Indication" is added as an item under the field ">Cell Information Item" (said modifications are marked with underlines). "Time offset Indication" is used to describe a time reference value between the cell base station receiving the load information and the cell base station transmitting the load information, such as a time difference between said two base stations. Accordingly, the cell base station receiving the load information may then be informed of the time difference between itself and the base station transmitting the load information, such that which is the PRB in the subframe under interference may be clarified. In some of embodiments of the present disclosure, said time offset indication may be replaced by a time information of the base station. A time indication may be the time information of the cell base station transmitting the load information with "Range" represented in floating numbers or integers. The cell base station receiving the load information may be informed of the time reference value (e.g., the time difference between said two base stations) between the cell base station receiving the load information and the cell base station transmitting the load information according to the time indication and a time when it transmits the DL or the UL.

Figure 6:
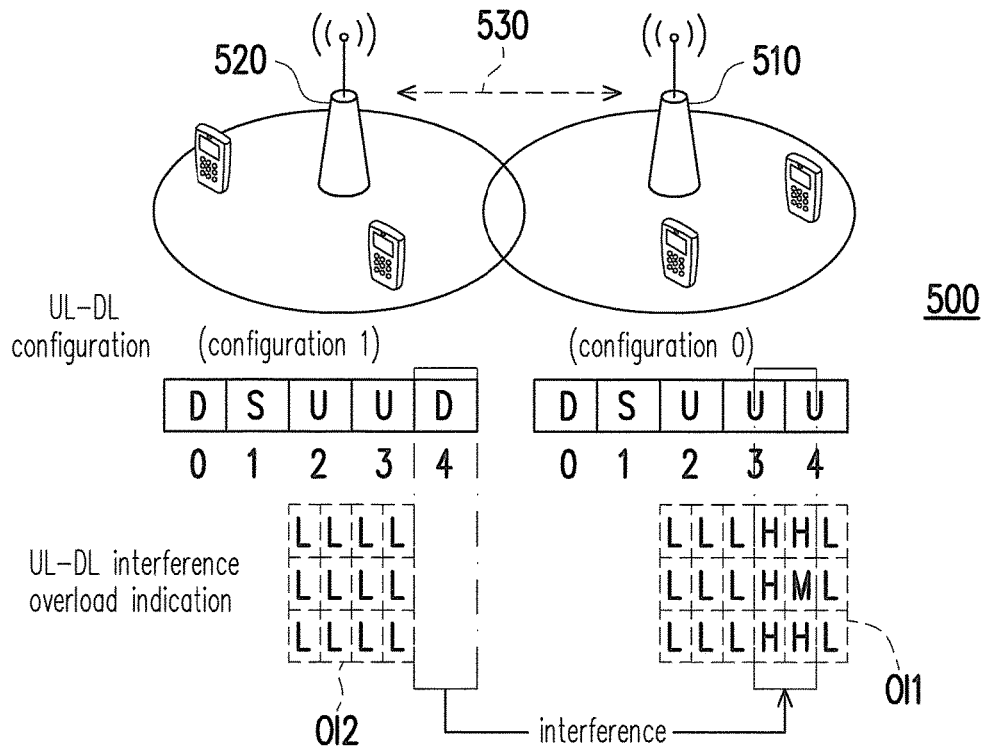

FIG. 6 is a schematic diagram of the wireless communication system 500 according to an embodiment of the present disclosure. The UL interference overload indication and the time indication are described by reference with FIG. 6. Unlike FIG. 5, since the time different is present between the base stations 510 and 520, parts of the UL frame 3 and parts of the UL frame 4 of the base station 510 of FIG. 6 are interfered by the DL subframe 4 of the base station 520, such that the UL interference overload indications OI1 of the base

TABLE (5)

| Information Name/Group Name | Presence | Range | Semantics description | IE type and reference |
|---|---|---|---|---|
| ... | ... | ... | ... | ... |
| >Cell Information Item | | 1 to <maxCellineNB> | | |
| >>Cell Identification (ID) | M | 1 to <maxCellineNB> | identification (ID) of the source cell | |
| >>UL Interference Overload Indication (OI) | O | <u>1 to <maxULSubframeinFrame></u> | | ECGI 9.2.17 |
| UL High Interference Information (HII) | | 0 to <maxCellineNB> | | 9.2.18 |
| ... | ... | ... | ... | ... |
| <u>>>Time Offset Indication</u> | <u>O</u> | <u>INTEGER(0 to 9)</u> | <u>Indicates that the time offset in subframe level between the timing of the cell and a coordinated timing</u> | ... |

Unlike Table (3), in Table (5), in addition to the modification for "Range" corresponding to ">>UL Interference station 510 are all marked as "H" or "M". Moreover, the base station 510 transmits the load information including the UL interference overload indications OI1 and the time offset indication (or the time reference value) to the base station 520 through the base station communication link 530.

In addition to provide a more preferable interference management in which the UL interference indication in the load information is capable of corresponding to the time offset indication, each of the interference overload indications may also corresponding to the related time offset indication in another embodiment of the present disclosure as shown in the load information listed in Table (6).

subframes. In other words, the interference overload indication displays all the interference levels for all the subframes. Since the time difference is present between the base stations 510 and 520, parts of the UL frame 3 and parts of the UL frame 4 of the base station 510 of FIG. 6 are interfered by the DL subframe 4 of the base station 520, such that the UL interference overload indications OI1 of the base

TABLE (6)

| Information Name/Group Name | Presence | Range | Semantics description | IE type and reference |
|---|---|---|---|---|
| Information Type | M | | | 9.2.13 |
| Cell Information | M | | | |
| >Cell Information Item | | 1 to <maxCellineNB> | | |
| . . . | . . . | . . . | . . . | . . . |
| >>Invoke Indication | O | | | 9.2.55 |
| >>Interference Overload Indication | O | 1 to <maxSubframeinFrame> | | |
| >>Time Offset Indication | O | INTEGER(0 to 9) | Indicates that the time offset in subframe level between the timing of the cell and a coordinated timing | |

Unlike Table (4), in Table (6), in addition to the modification for the filed ">>Time offset Indication" added as the item under the field ">Cell Information Item" in Table (4), the field "Time offset Indication" is also added (said modifications are marked with underlines). "Time offset indication" is used to describe a time for the cell base station to transmit the load information.

Figure 7:
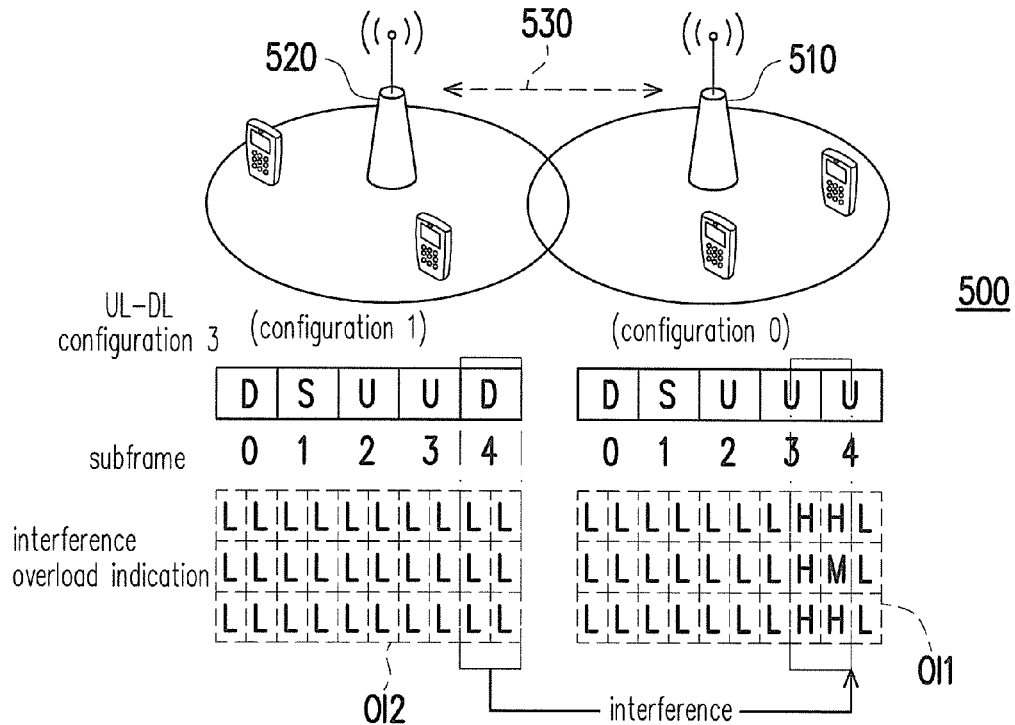

FIG. 7 is a schematic diagram of the wireless communication system 500 according to an embodiment of the present disclosure. The interference overload indication and the time indication are described by reference with FIG. 7. Unlike FIG. 5 and FIG. 6, in addition to display interference level of the UL subframe, the interference overload indication of FIG. 7 further displays interference level of the DL station 510 are all marked as "H" or "M". Moreover, the base station 510 transmits the load information including the UL interference overload indications OI1 and the time offset indication (or the time indication) to the base station 520 through the base station communication link 530.

In the present disclosure, a new type of the load information having at least one carrier information element may also be provided, and each of the carrier information elements may include an interference load indication information unit and a corresponding time offset indication. Said time offset indication may be replaced by a time information of the base station as shown in Table (7).

TABLE (7)

| Information Name/Group Name | Presence | Range | Semantics description | IE type and reference |
|---|---|---|---|---|
| Information Type | M | | | 9.2.13 |
| Cell Information | M | | | |
| >Cell Information Item | | 1 to <maxCellineNB> | | |
| >>Cell Identification (ID) | M | | identification (ID) of the source cell | ECGI 9.2.14 |
| . . . | . . . | . . . | . . . | . . . |
| >>Invoke Indication | O | | | 9.2.55 |
| >>Time Offset Indication | O | INTEGER(0 to 9) | Indicates that the time offset in subframe level between the timing of the cell and a coordinated timing | |
| >Carrier Information | O | | | |
| >>Carrier Information Item | | 1 to <maxCellineNB> | | |
| >>>Carrier ID | M | | identification of the source cell | ECGI 9.2.14 |
| >>>UL Interference Overload Indication | O | 1 to <maxULSubframeinFrame> | | 9.2.17 |
| >>>UL High Interference Information | O | 0 to <maxCellineNB> | | |
| >>>>Target Cell Identification | M | | ID of the cell for which the HII is meant | |

TABLE (7)-continued

| Information Name/Group Name | Presence | Range | Semantics description | IE type and reference |
|---|---|---|---|---|
| >>>>UL High Interference Indication | M | | | |
| >>>Relative Narrowband Tx Power (RNTP) | O | | | |
| >>>Almost Blank Subframe Information (ABS) Information | O | | | |
| >>>Invoke Indication | O | | | |

For instance, each of the carrier information may include a carrier identification, the UL high interference information, the RNTP, the ABS and the DL interference overload indication. The UL high interference information further includes the cell ID with occurrence of HII (i.e., "Target Cell Identification") and a corresponding UL high interference indication.

Figure 8:
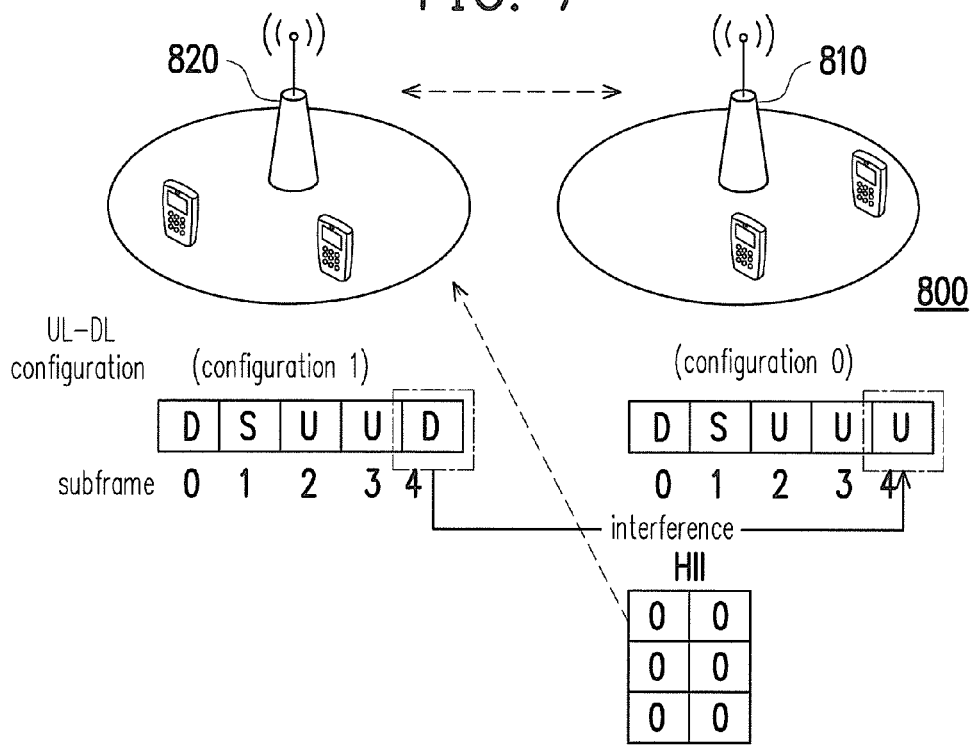
FIG. 8 is a schematic diagram of a wireless communication system 800 according to an embodiment of the present disclosure.

The disclosure is also capable of adjusting the UL high interference information (HII), so that usage of the UL high interference information may be expanded. Referring to FIG. 8, FIG. 8 is a schematic diagram of a wireless communication system 800 according to an embodiment of the present disclosure. A UL subframe 4 of a base station 810 is already interfered by a DL subframe 4 of a base station 820. The base station transmitting the load information with the UL high interference information (HII) is 810, and the station 820 receiving the load information with the UL high interference information is 820. In case each of the values in the UL high interference information received by the base station 820 is "1", it indicates that the PRBs corresponding to the values are the PRBs that the base station 810 intended to use for transmitting a UL signal of the user equipment UE, and, the base station 820 is requested not to use said specific PRBs, such that interference to the base station 820 from the user equipment UE under the base station 810 may be mitigated. In contrast, in case each of the values in the UL high interference information received by the base station 820 is "0", it indicates that the base station 820 may use any PRBs corresponding to the values.

However, the UL interference information and other information cannot be used for the base station 810 to actively inform other base stations (e.g., the base station 820) about a message of "the base station 820 is already interfering me (the base station 810), please do avoid" for adjusting the interference to the transmission. Accordingly, the base stations 810 and 820 of the present disclosure may transfer said message of "the base station 820 is already interfering me (the base station 810), please do avoid" through the UL high interference information with a specific content, thereby expanding usage of the UL interference information. Said specific content of the UL high interference information may be, all values being set to "0", or being "0" and "1" which are cross-arranged in sequence. Because the load information includes a base station ID to be transmitted to another base station (e.g., 820), the base station 810 may transmit the load information to some neighboring base stations, so that the neighboring base stations may determine whether the interference to themselves are came from the base station 820, thereby arranging a prevention by adjusting the UL-DL configuration or of the PRB (physical resource block) allocation. The base station 810 may also broadcast said load information, so that misjudgments may be avoided by the other base stations by knowing the base station ID in the load information.

It should be noted that, the base station may use a bitmap with proper bit length (e.g., 6 bits) to indicate that a selected number of subframes, or one or more UL subframes belong to a first subframe group, while the other UL subframes belong to a second subframe group. The content of possible additional UL interference overload index is as shown in the load information listed in Table (8).

TABLE (8)

| Information Name/Group Name | Presence | Range | Semantics description | IE type and reference |
|---|---|---|---|---|
| Information Type | M | | | 9.2.13 |
| Cell Information | M | | | |
| >Cell Information Item | | 1 to <maxCellineNB> | | |
| >>Cell Identification (ID) | M | | identification (ID) of the source cell | ECGI 9.2.14 |
| . . . | . . . | . . . | . . . | . . . |
| Additional UL Interference Overload indication | O | | | 9.2.XX |
| Additional UL Interference Overload Index | M | | | BIT STRING(SIZE (6)) |

Unlike Table (2), "Additional UL Interference Overload Index" and "Additional UL Interference Overload indication" are further added in Table (8), and at least one of the additional UL interference overload index is implemented by using the bitmap of 6 bits as an example. Each position in the bitmaps represents each UL subframe. In case a value of one specific position in the bitmap is "1", it indicates that the interference levels of that UL subframe is represented by "additional UL interference overload indication". In case a value of one specific position in the bitmap is "0", it indicates that the interference levels of that UL subframe is represented by "UL interference overload indication". Accordingly, different interference levels may be distinguished. It is not excluded that the meanings of "0" and "1"

can be completely opposite. In the present embodiment, a maximal number of the UL subframe is 6, but it may also be other numbers.

In summary, in the interference management method, the anchor apparatus, the base station and the system thereof as provided according to the present disclosure, the base station information is transmitted between the base stations, so that the base stations having mutual interference may select the UL-DL configurations with the interference relationship having lower interference or less conflicting subframes from among the same group of the UL-DL configurations to manage interference. In addition, the base station may be clearly informed of the interference levels in each or numbers of the UL and the DL subframes according to the interference overload indication, such that the base station may be dynamically transmit data through the resource blocks with lower interference. The base station may also be informed of the interference relationship between base stations according to the high interference information. Based on above, each embodiment of the present disclosure is capable of managing interference by using the load information transmitted between the base stations.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An interference management method for a wireless communication system, wherein the wireless communication system has a plurality of base stations, and the interference management method comprises:
   receiving at least one base station information from one of the base stations, wherein the base stations communicate with at least one corresponding user equipment by using at least one uplink-downlink (UL-DL) configuration;
   finding at least one interference relationship between the base stations according to the base station information, and grouping the base stations into at least one cluster according to the at least one interference relationship, wherein each of the at least one cluster has at least one base station;
   deciding a selected group of UL-DL configurations related to one or more clusters of the at least one cluster, wherein the selected group of UL-DL configurations comprises at least one UL-DL configuration; and
   informing at least one base station in the one or more clusters of the at least one cluster to adjust the UL-DL configuration of the at least one base station according to the selected group of UL-DL configurations,
   wherein the base station information of a corresponding base station comprises a load information, and further comprises at least one of UL-DL configuration, a base station activation situation and a resource status report, wherein the load information comprising:
      a plurality of overload indications, the overload indications indicate UL interference levels of physical resource blocks of UL subframes of the base station which sends the overload indications, each of the overload indications is related to each of subframes or each of subframe groups and is configured to determine the UL-DL configuration for the corresponding base station; and
      at least one additional interference overload index having a plurality of positions respectively corresponding to a second corresponding subframe, and configured to indicate the subframe groups corresponding to each of the overload indications.

2. The interference management method of claim 1, wherein the base stations in the same cluster have at least one interference relationship.

3. The interference management method of claim 1, wherein the UL-DL configuration is a transmission direction configuration of a plurality of subframes of a frame, and the subframes being grouped into a plurality of subframe groups each comprising at least one of the subframes.

4. The interference management method of claim 1, wherein the load information further comprise:
   at least one high interference information each corresponding to a target base station and physical resource blocks,
   wherein when the high interference information is a specific content, the high interference information indicates that the base station transmitting the UL high interference information is interfered by the target base station.

5. The interference management method of claim 1, wherein the base station information comprise at least one UL-DL configuration of a corresponding base station,
   and the step of informing the at least one base station in the at least one cluster further comprises:
      not informing the at least one base station if the UL-DL configuration originally provided by the at least one base station is already belong to the selected group of UL-DL configurations.

6. The interference management method of claim 1, wherein the base stations have seven UL-DL configurations, the selected group of UL-DL configurations comprising at least one UL-DL configuration, and
   a first base station in the at least one cluster selecting one UL-DL configuration from the selected group of UL-DL configurations for setting the UL-DL configuration of the base station.

7. A wireless communication system, comprising:
   an anchor apparatus; and
   a plurality of base stations communicating with the anchor apparatus,
   wherein the anchor apparatus receives at least one base station information from one of the base stations, wherein the base stations communicate with at least one corresponding user equipment by using at least one uplink-downlink (UL-DL) configuration, the anchor apparatus finds at least one interference relationship between the base stations according to the base station information, groups the base stations into at least one cluster having at least one base station according to the at least one interference relationship, and decides a selected group of UL-DL configurations related to one or more clusters of the at least one cluster, wherein the selected group of UL-DL configurations comprises at least one UL-DL configuration, and the anchor apparatus informs at least one base station in at least one cluster to adjust the UL-DL configuration of the at least one base station according to the selected group of UL-DL configurations,
   wherein the base station information of a corresponding base station comprises a load information, and further comprises at least one of UL-DL configuration, a base station activation situation and a resource status report, the load information comprising:
- a plurality of overload indications, the overload indications indicate UL interference levels of physical resource blocks of UL subframes of the base station which sends the overload indications, each of the overload indications is related to each of subframes or each of subframe groups and is configured to determine the UL-DL configuration for the corresponding base station; and
- at least one additional interference overload index having a plurality of positions respectively corresponding to a second corresponding subframe, and configured to indicate the subframe groups corresponding to each of the overload indications.

8. The wireless communication system of claim 7, wherein the anchor apparatus is one single station or one of the base stations.

9. An anchor apparatus for a wireless communication system having a plurality of base stations, and the anchor apparatus comprising:
- a transceiver receiving at least one corresponding base station information from one of the base stations, wherein the base stations communicate with at least one corresponding user equipment by using at least one uplink-downlink (UL-DL) configuration; and
- a processor coupled to the transceiver, the processor finding at least one interference relationship between the base stations according to the base station information, grouping the base stations into at least one cluster having at least one base station according to the at least one interference relationship, and deciding a selected group of UL-DL configurations related to one or more clusters of the at least one cluster, wherein the selected group of UL-DL configurations comprises at least one UL-DL configuration, and the processor informs at least one base station in the at least one cluster through the transceiver to adjust the UL-DL configuration of the at least one base station according to the selected group of UL-DL configurations,
wherein the base station information of a corresponding base station comprises a load information, and further comprises at least one of UL-DL configuration, a base station activation situation and a resource status report, the load information comprising:
- a plurality of overload indications, the overload indications indicate UL interference levels of physical resource blocks of UL subframes of the base station which sends the overload indications, each of the overload indications is related to each of subframes or each of subframe groups and is configured to determine the UL-DL configuration for the corresponding base station; and
- at least one additional interference overload index having a plurality of positions respectively corresponding to a second corresponding subframe, and configured to indicate the subframe groups corresponding to each of the overload indications.

10. The anchor apparatus of claim 9, wherein the anchor apparatus is one single station or one of the base stations.

11. A wireless communication system, comprising:
a first base station and a second base station,
wherein the first base station transmits a base station information to the second base station, wherein the base station information comprise:
- a plurality of overload indications, and the overload indications are respectively corresponding to a plurality of subframes or a plurality of subframe groups, each of the overload indications is related to each of the subframes or each of the subframe groups, wherein each of the subframe groups comprises at least one subframe, and the overload indications are configured to indicate a plurality of uplink (UL) interference levels corresponding to a plurality of physical resource blocks of the plurality of UL subframes or the plurality of UL subframe groups of the first base station; and
- at least one additional interference overload index having a plurality of bits, a position of each of the bits is corresponding to only one of the subframes, and the at least one additional interference overload index configured to indicate the subframe groups corresponding to each of the overload indications.

12. The wireless communication system of claim 11, wherein the base station information comprise a plurality of high interference information, and the high interference information are respectively corresponding to the subframes or the subframe groups.

13. The wireless communication system of claim 12, wherein the base station information further comprise:
- a time indication, wherein the time indication is a time information of the first base station for transmitting the high interference information.

14. The wireless communication system of claim 12, wherein the base station information further comprise:
- a time offset indication, wherein the time offset indication is a time reference value used between the second base station receiving the high interference information and the first base station transmitting the overload indications.

15. The wireless communication system of claim 11, wherein the base station information comprise:
- a plurality of interference overload indications for representing interference levels of all or parts of UL subframes and DL subframes.

16. The wireless communication systems of claim 15, wherein the overload indications further comprise a time indication.

17. The wireless communication system of claim 11, wherein the second base station confirms interference in its UL-DL configuration according to the overload indications, or, the second base station adjust its UL-DL configuration according to the overload indications.

18. The wireless communication systems of claim 11, wherein the base station information further comprise:
- at least one high interference information each corresponding to a target base station and physical resource blocks in at least one of the subframes,
wherein when the high interference information is a specific content, the high interference information indicates that the first base station transmitting the high interference information is interfered by the second base station.

19. The wireless communication system of claim 18, wherein the specific content of the high interference information comprises values in the high interference information being all 0, all 1, numbers of values being 1 or 0 while others being 0 or 1, or, being 1 and 0, or 0 and 1 which are cross-arranged in sequence, the base station information further comprises a load information of a X2 application protocol (X2AP); and when the high interference information is the specific content, the base station information further informs the second base station that the first base station is interfered by the second base station, and indicates physical resource blocks in at least one of the subframes interfered by the second base station.

20. A base station for a wireless communication system having the base station and another base station, and the base station comprising:
   a transceiver directly or indirectly transmitting at least one corresponding base station information to the another base station; and
   a processor coupled to the transceiver, and the processor transmitting a base station information to the another base station through the transceiver, wherein the base station information comprise:
      a plurality of overload indications, and the overload indications are respectively corresponding to a plurality of subframes or a plurality of subframe groups, each of the overload indications is related to each of the subframes or each of the subframe groups, wherein each of the subframe groups comprises at least one subframe, and the overload indications are configured to indicate a plurality of uplink (UL) interference levels corresponding to a plurality of physical resource blocks of the plurality of UL subframes or the plurality of UL subframe groups of the another base station; and
      at least one additional interference overload index having a plurality of positions respectively corresponding to a corresponding subframe, and configured to indicate the subframe groups corresponding to each of the overload indications,
      wherein the base station information further comprise at least one high interference information each corresponding to a target base station and physical resource blocks in at least one of the subframes, wherein when the high interference information is a specific content, the high interference information indicates that the first base station transmitting the high interference information is interfered by the second base station,
      wherein the specific content of the high interference information comprises values in the high interference information being all 0, all 1, numbers of values being 1 or 0 while others being 0 or 1, or, being 1 and 0, or 0 and 1 which are cross-arranged in sequence; the base station information further comprises a load information of a X2 application protocol (X2AP); and when the high interference information is the specific content, the base station information further informs the second base station that the first base station is interfered by the second base station, and indicates physical resource blocks in at least one of the subframes interfered by the second base station.

21. A wireless communication system, comprising:
   a first base station and a second base station,
   wherein the first base station directly or indirectly transmits a base station information to the second base station, wherein the base station information comprises at least one high interference information, each of the high interference information respectively corresponding to a target base station and physical resource blocks,
   wherein when the high interference information is a specific content, the high interference information indicates that the first base station transmitting the high interference information is interfered by the second base station,
   wherein the specific content of the high interference information comprises values in the high interference information being all 0, all 1, numbers of values being 1 or 0 while others being 0 or 1, or, being 1 and 0, or 0 and 1 which are cross-arranged in sequence, the base station information further comprises a load information of a X2 application protocol; and when the high interference information is the specific content, the base station information further comprises an indication information which informs the second base station that the first base station is interfered by the second base station, and indicates physical resource blocks interfered by the second base station.

22. The wireless communication systems of claim 21, wherein the base station information further comprise:
   a plurality of overload indications, and the overload indications respectively corresponding to a plurality of subframes or a plurality of subframe groups, each of the overload indications is related to each of the subframes or each of the subframe groups, wherein each of the subframe groups comprises at least one subframe, and the overload indications are configured to indicate a plurality of interference levels corresponding to the physical resource blocks of the plurality of subframes or the plurality of subframe groups of the first base station; and
   at least one additional interference overload index having a plurality of positions respectively corresponding to a corresponding subframe, and configured to indicate the subframe groups corresponding to each of the overload indications.

23. A base station for a wireless communication system having the base station and another base station, and the base station comprising:
   a transceiver directly or indirectly transmitting at least one corresponding base station information to the another base station; and
   a processor coupled to the transceiver, and the processor transmitting a base station information to the another base station through the transceiver, wherein the base station information comprises at least one high interference information, each of the high interference information respectively corresponding to a target base station and physical resource blocks,
   wherein when the high interference information is a specific content, the high interference information indicates that the base station transmitting the high interference information is interfered by another base station, wherein the specific content of the high interference information comprises values in the high interference information being all 0, all 1, numbers of values being 1 or 0 while others being 0 or 1, or, being 1 and 0, or 0 and 1 which are cross-arranged in sequence, the base station information further comprises a load information of a X2 application protocol; and when the high interference information is the specific content, the base station information further comprises an indication information which informs the second base station that the first base station is interfered by the second base station, and indicates physical resource blocks interfered by the second base station.

* * * * *